F. A. LITTLEFIELD.
STEAM TRAP AND VALVE THEREFOR.
APPLICATION FILED JUNE 21, 1915.
1,272,470.
Patented July 16, 1918.
3 SHEETS—SHEET 3.
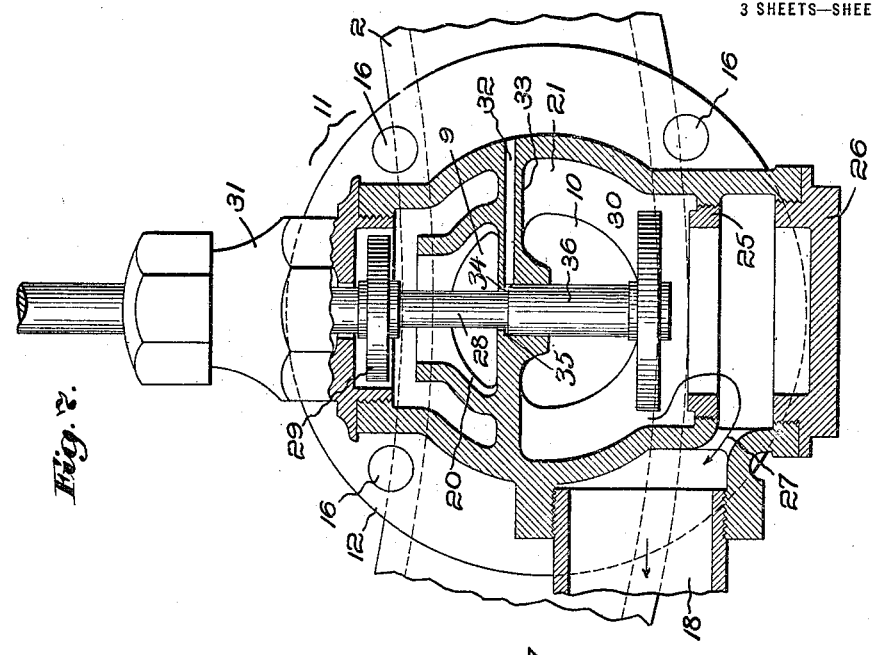
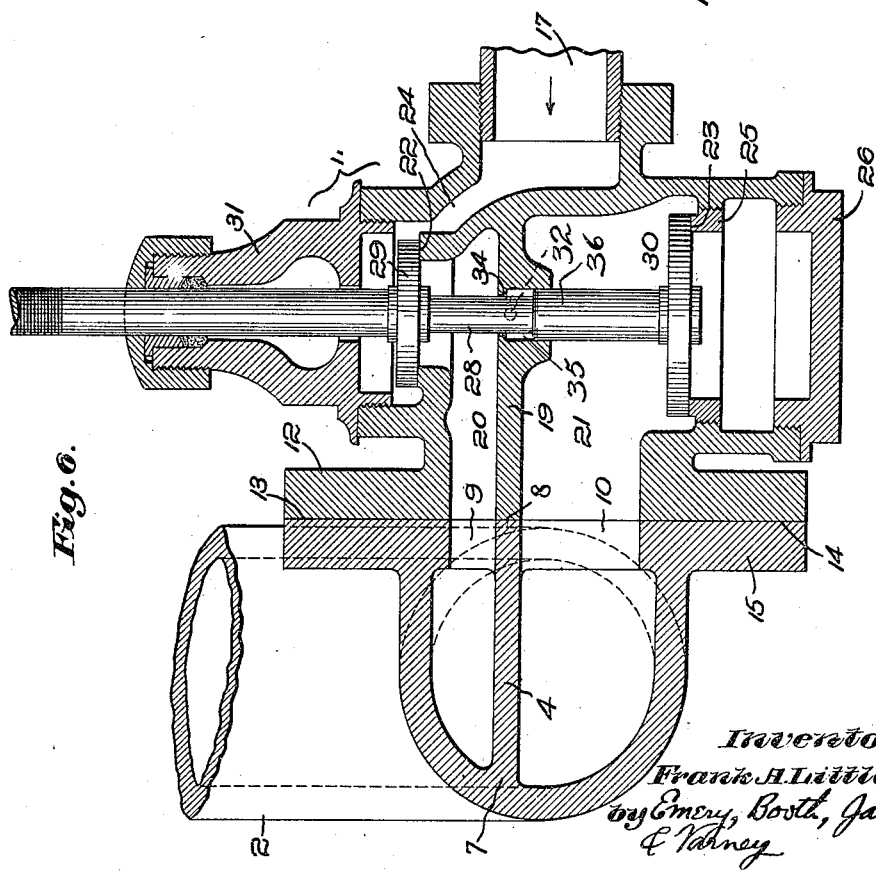
Inventor:
Frank A. Littlefield
by Emery, Booth, Janney
& Varney
Attys.

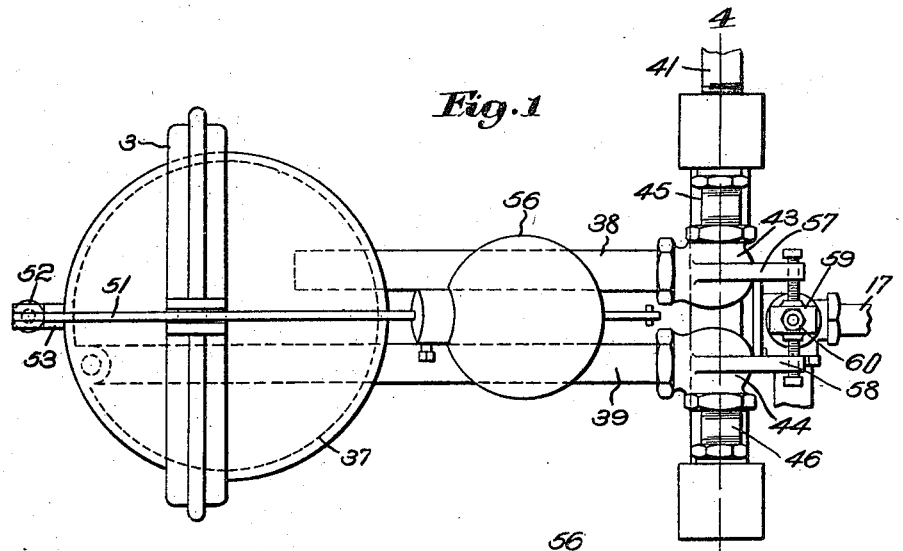
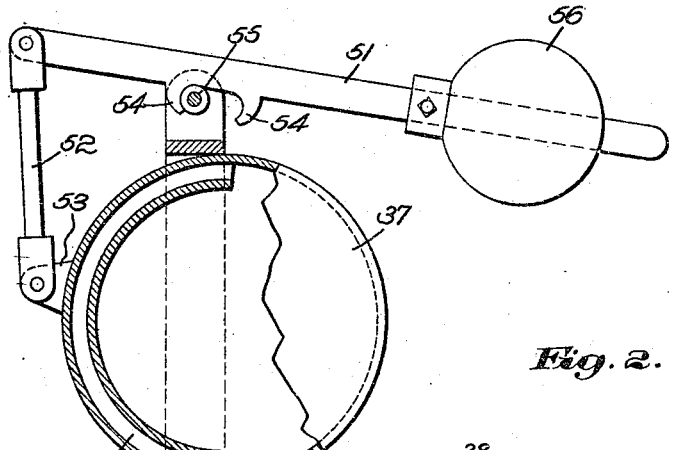
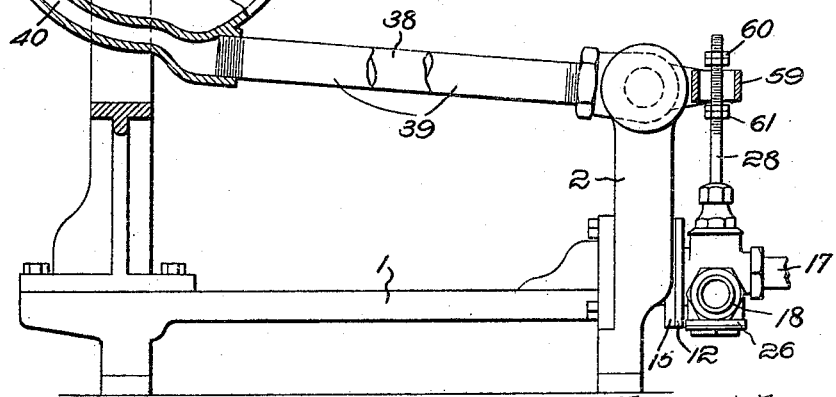

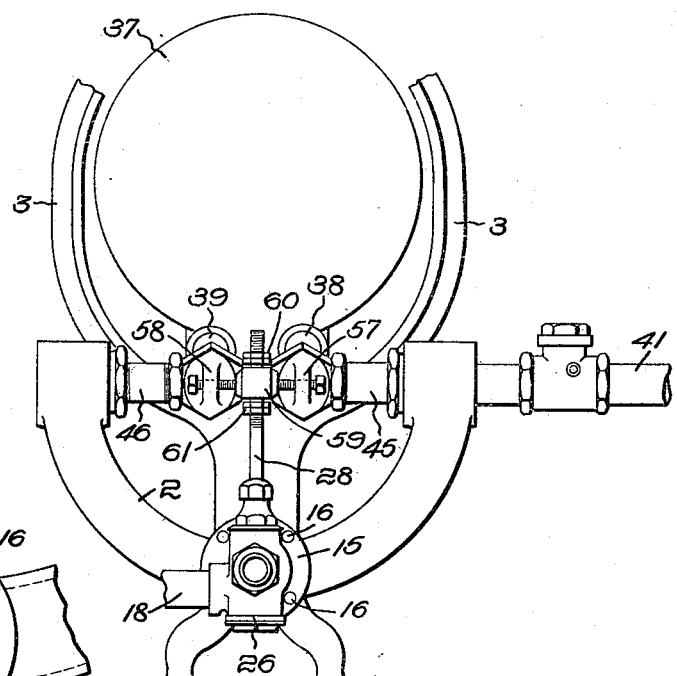
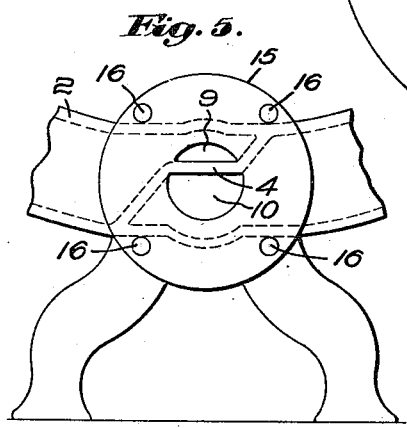
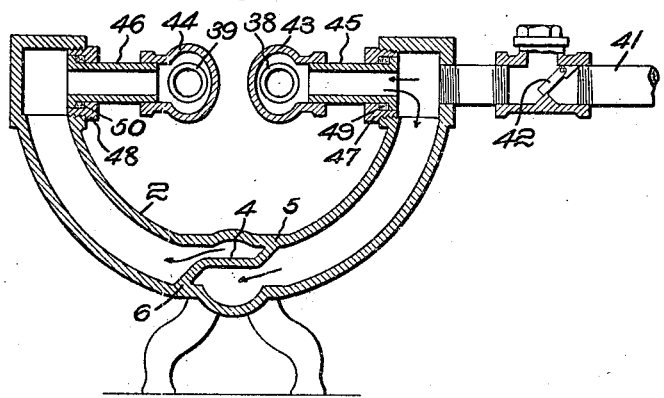

UNITED STATES PATENT OFFICE.

FRANK A. LITTLEFIELD, OF NASHUA, NEW HAMPSHIRE, ASSIGNOR TO NASHUA MACHINE COMPANY, OF NASHUA, NEW HAMPSHIRE, A CORPORATION OF MAINE.

STEAM-TRAP AND VALVE THEREFOR.

1,272,470.

Specification of Letters Patent.

Patented July 16, 1918.

Application filed June 21, 1915. Serial No. 35,260.

*To all whom it may concern:*

Be it known that I, FRANK A. LITTLE-FIELD, a citizen of the United States, and a resident of Nashua, in the county of Hillsboro and State of New Hampshire, have invented an Improvement in Steam-Traps and Valves Therefor, of which the following description, in connection with the accompanying drawings, is a specification, like characters on the drawings representing like parts.

This invention relates to steam traps and to valves adapted for use in varying relations, but particularly adapted for use in connection with steam and like traps. The invention also relates to combined steam traps and valves as hereinafter set forth.

In order that the principle of the invention may be readily understood, I have disclosed a single embodiment thereof in the accompanying drawings, wherein—

Figure 1 is a plan view of an illustrative steam trap embodying my invention and to which the valve of my invention may be applied;

Fig. 2 is a side elevation, partially in section, of the trap and valve shown in Fig. 1 and constituting the preferred embodiment of my invention;

Fig. 3 is an end elevation, partially in section, of the trap and valve shown in Fig. 1, parts being broken away;

Fig. 4 is a vertical section taken on the line 4—4 of Fig. 1;

Fig. 5 is a detail representing a portion of the yoke or frame of the trap;

Fig. 6 is a vertical section on an enlarged scale taken through a portion of the yoke or frame of the trap and the valve casing attached thereto; and Fig. 7 is a view taken at right angles to Fig. 6.

Referring more particularly to the drawings, the illustrative steam trap with which I have herein represented the valve of my invention as associated, comprises a frame including a tripod 1 for supporting the various parts of the trap, and a segmental ring 2 and another ring 3 rising from the tripod adjacent opposite ends thereof. The segmental ring 2 is hollow, as most clearly shown in Fig. 4. At a suitable point, and preferably about mid-length thereof, the ring 2 is provided with a transverse partition 4 extending from the upper wall of the ring 2 at 5 to the lower wall thereof at 6. The said partition 4 extends from the rear wall of the ring, as indicated at 7 in Fig. 6, to the extreme front thereof, as indicated at 8, passages 9, 10 being provided above and below said partition 4 for the admission of steam and for the outlet of water of condensation respectively. The valve casing is indicated generally at 11 in the several figures. It is provided at its rear face with a preferably circular flange 12 having a plane or vertical rear face 13, which is adapted to contact with the plane face 14 of a similar flange 15 upon the ring 2, it being evident that if desired suitable packing may be interposed between the faces of said flanges. The said flanges are secured together in any suitable manner, and preferably by means of bolts 16 indicated most clearly in Figs. 5 and 7.

The valve casing 11 is provided with a steam inlet pipe 17 indicated most clearly in Fig. 6 and with a water outlet 18 indicated most clearly in said figure, said inlet and outlet being at opposite sides of a transverse partition 19 in the valve casing and extending to the rear open face thereof, where it registers with the front edge of the partition 4 of the ring 2. Thus, the two partitions 4, 19, are provided thereabove with a steam inlet passage indicated generally at 20, and therebelow with a water outlet passage indicated generally at 21.

The valve casing is provided with an upper valve seat 22 and a lower and preferably larger valve seat 23, there being a passage 24 leading from the steam inlet 17. If desired, the valve seat 23 may be formed as a detachably threaded ring 25 and beneath the same there may be a threaded, readily removable cap 26 permitting access to the interior of said valve casing. Between the ring 25 and the cap 26, as shown most clearly in Fig. 7, there is a water outlet passage 27 leading to the water outlet 18.

Seated in the valve casing is a suitable valve stem 28 having fast thereon an upper disk 29 adapted to be received upon the valve seat 22 and a lower disk 30 adapted to be received upon the valve seat 23. Said valve stem 28 extends upwardly through a suitable bonnet or other member 31 of any suitable construction.

The partition 19 is provided with a suitable vent passage 32 leading through a wall of said valve casing, indicated at 33, and terminating at the enlarged portion 34 of the opening 35 for the valve stem. Viewing Figs. 6 and 7, it will be observed that the valve stem 28 has an enlarged portion 36 adapted to be seated in and to fill the enlarged portion of the opening 35, so that when the valve disks 29, 30 are lifted from their seats, the vent passage 32 is closed, and when said disks are seated, said vent passage is open.

Assuming that the valve is to be used in connection with a steam trap, it is obvious that the latter may be of any suitable type. In the several figures, I have represented a bowl 37, which is provided with a pair of pipes 38, 39, the former constituting a water inlet and also a water outlet, and the latter constituting a steam inlet, and being in communication with a steam duct 40 which may be cast in the wall of the bowl, and having an outlet communicating with the interior of the bowl at the top thereof. The water inlet pipe 38 is in communication with the main water inlet pipe 41 leading from the boiler or any suitable source, and is provided with a check valve 42 preventing return of the water through said pipe 41 and compelling the water discharged from the trap through said pipe 38 to pass into the right hand side of the segmental ring 2, viewing Fig. 4, as indicated by arrows in said figure.

The pipes 38, 39 are provided with elbow pipes 43, 44 having trunnion tubes 45, 46 journaled in bearings 47, 48 that are threaded into the segmental ring 2 at the ends thereof, as indicated most clearly in Fig. 4. By this arrangement the bowl 37 may tilt for filling and for emptying the same. The trunnion tubes 45, 46 and the bearings 47, 48 are provided with flanges between which are confined packing rings 49, 50.

The tilting of the bowl 37 is preferably governed by means of a weighted lever 51, connected by a link 52 with an ear 53 on the said bowl. In the particular form of weighted lever and link connection shown, the operation of the trap is rendered desirably prompt and actively responsive to predetermined conditions of water in the bowl 37 by an arrangement of leverage changing device herein shown as consisting of an elongated bearing for the lever 51 formed by fingers 54 projecting from said lever and constituting between them a bearing engaging a roller 55 on the frame. When the bowl 37 is in its up position, as shown in Fig. 2 the left hand finger 54 engages the roller 55. When the bowl tilts downward the rocking of the lever 51 will lift the weight 56 thereon and cause the lever to slide in the direction of its length to bring its other finger 54 against the roller 55, thereby increasing the effective leverage of the bowl 37 on the lever weight. It is, however, obvious that any other suitable means may be provided to coöperate with the bowl 37 in effecting the proper tilting or movement thereof.

In order that the accumulated water in the bowl 37 may be utilized to control the valve mechanism hereinbefore referred to, I have provided suitable mechanism for operating said valve by the movement of the bowl. To this end, I have herein represented the elbow pipes 43, 44 as provided with ears 57, 58 projecting therefrom. These ears are provided to receive the journaled ends of a suitable cross head or other device 59 loosely receiving the valve stem 28 between the adjustable nuts 60, 61 thereof. If desired, the upper nuts may be set somewhat above the cross head 59 so as to permit a slight play and to enable the bowl to tilt somewhat before bringing the cross head 59 into engagement with said upper nuts. By this arrangement the bowl acquires a certain momentum and effective force below it becomes active in lifting the valve disks 29, 30 from their seats.

The operation of the valve as applied to a steam trap herein represented is as follows. It may be supposed that the bowl 37 is in its uptilted position, being held therein by its weighted lever 51. When in this position the valve disk 29 is held closed by the pressure of the steam which enters through the steam inlet pipe 17 and fills the valve casing above said valve disk 29. The valve disk 30 is likewise held closed. The steam does not pass beyond the valve disk 29 until the bowl 37 fills.

The water of condensation enters through the water inlet pipe 41, passes the check valve 42 and thence passes through the trunnion tube 45 and the pipe 38 into the steam trap 37. Inasmuch as the valve disk 30 is held closed, the water of condensation cannot pass downward through the right hand side of the segmental ring 2 and through the passage 27 to the water outlet 18. When sufficient water of condensation accumulates in the bowl 37, it will overcome the counterbalance weight and cause the bowl to tilt downward. In that application of my invention herein shown, this movement is accelerated by the automatic change in the leverage of the weighted lever 51 in sliding on its fulcrum roller 55. The initial tilt of the bowl rocks the cross head 59 up into engagement with the upper nuts 60 on the valve stem 28, taking up the play between them, if such exists. Further tilting of the bowl snatches the valve disks 29, 30 quickly and positively from their seats and therefore permits live steam to pass through the steam pipe 17 past said valve disk 29, and thence into the passage 20 above the partitions 4, 19, thence into the left hand side of the segmental ring 2, viewing Fig. 4, thence into the trunnion ring 46 and the pipe 39 and duct 40 into the steam trap 37 above the water of condensation therein. The steam entering the bowl 37 through the steam duct 40 compels the discharge of the water of condensation from the bowl through the pipe 38, the trunnion pipe 45 and the right hand side of the segmental ring 2, viewing Fig. 4, where it enters the passage 21 below the partitions 4, 19, and then through the port 27 into the water outlet 18, by which it may be returned to the boiler or any suitable tank, it being evident that the check valve 42 prevents the return of the water of condensation through the main water inlet pipe 41. The steam vent 32 being open when the valve disks 29, 30 are seated, permits the venting of the steam in the trap 37 through the enlarged portion 34 of the opening 35 for the valve stem. The means for operating the valve mechanism herein disclosed may be widely varied within the scope of the invention. It will be observed that the single valve means having the two disks 29, 30 controls the admission of steam and the discharge of the water of condensation. Not only is the structure very greatly simplified, but the parts will operate successfully with any pressure, a result not heretofore obtainable in any steam trap so far as I am aware. I have herein represented the segmental ring 2 and the valve casing 11 as provided with flanges 12 and 15, by which they may be secured together. Obviously, however, said parts may be secured in any suitable manner, and my invention is in no wise limited to the construction or arrangement herein shown. An important feature of my invention is the provision of the partitions 4, 19 in said segmental ring 2 and valve casing 11 respectively, this being brought into register when said parts are attached in any suitable manner.

So far as I am aware, I am the first to provide a steam or like trap with a single valve means controlling both the steam inlet and the water outlet, and particularly am I the first to provide a construction for this purpose wherein two valve disks are mounted upon the same stem.

The invention herein disclosed and claimed relates not only to the valve means and to the combination of such valve means with a steam or other trap, but relates also to the general combination and organization of mechanism disclosed, for any purpose to which the same may be adapted. Particularly does the invention relate to a steam trap of the general organization and construction herein disclosed.

I have herein referred to the part 2 as a segmental ring. It may be of any suitable form, and in certain of the claims I have broadly designated the same as a yoke.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A steam trap comprising in combination, a movable bowl, a steam inlet pipe, a combined water inlet and water outlet pipe, a fitting, valve members in said fitting and respectively controlling the flow of water of condensation and steam, and an operating connection between the bowl and said valve means, whereby the latter is operated by movement of the bowl.

2. A steam trap comprising in combination, a movable bowl, a steam inlet pipe, a combined water inlet and water outlet pipe, a fitting, a reciprocatory valve means having members in said fitting controlling the flow of steam and water of condensation, and an operating connection between the bowl and said valve means, whereby the latter is operated by movement of the bowl.

3. A steam trap comprising in combination, a movable bowl, a steam inlet pipe, a combined water inlet and water outlet pipe, a reciprocatory valve having two disks respectively controlling the steam inlet and the water outlet, and an operating connection between the bowl and said valve, whereby the latter is operated by movement of the bowl.

4. A steam trap comprising in combination, a movable bowl, counterweighting means therefor, a steam inlet pipe, a combined water inlet and water outlet pipe, and a fitting having valve means controlling the flow of steam and water and the venting of steam from said trap, and an operating connection between the bowl and said valve, whereby the latter is operated by movement of the bowl.

5. A steam trap comprising in combination, a movable bowl, counterweighting means therefor, a steam inlet pipe, a water inlet pipe, water outlet means, a fitting, valve means therein having members controlling the flow of steam and water and permitting the simultaneous inflow of steam and outflow of water of condensation, and an operating connection between the bowl and said valve means, whereby the latter is operated by movement of the bowl.

6. A steam trap comprising in combination, a movable bowl, counterweighting means therefor, a steam inlet pipe, a water inlet pipe, water outlet means, a fitting, valve means therein having members controlling the flow of steam and water and the venting of steam from the bowl, and an operating connection between the bowl and said valve means, whereby the latter is operated by movement of the bowl, 7. A steam trap comprising in combination, a movable bowl having a steam inlet and a combined water inlet and water outlet, and a valve stem having thereon two disks respectively controlling the flow of steam and water.

8. A steam trap comprising in combination, a movable bowl having a steam inlet and a combined water inlet and water outlet, a valve stem having thereon two disks respectively controlling the flow of steam and water, and an operating connection between said bowl and said valve stem.

9. A steam trap comprising in combination, a movable bowl, a yoke coöperating therewith, steam inlet and water inlet and outlet means coöperating therewith, said yoke having a partition separating the steam inlet and water outlet, a valve casing at said partition and valve means in said casing coöperating with said trap.

10. A steam trap comprising in combination, a movable bowl, a yoke coöperating therewith, a steam inlet and water inlet and outlet means in communication with said yoke, the latter having a partition separating the steam inlet and water outlet, and a valve casing having a partition coöperating with the partition in the yoke.

11. A steam trap comprising in combination, a movable bowl, a yoke coöperating therewith, a steam inlet and water inlet and outlet means in communication with said yoke, the latter having a partition separating the steam inlet and water outlet, a valve casing having a partition coöperating with that in the yoke, and valve means in said casing controlling the flow of water and steam.

12. A steam trap comprising in combination, a movable bowl, a yoke coöperating therewith, a steam inlet and water inlet and outlet means in communication with said yoke, the latter having a partition separating the steam inlet and water outlet, a valve casing having a partition coöperating with that in the yoke, and a reciprocatory valve having members controlling the flow of steam and water.

13. A steam trap comprising in combination, a movable bowl, a yoke coöperating therewith, a steam inlet and water inlet and outlet means in communication with said yoke, the latter having a partition separating the steam inlet and water outlet, a valve casing having a partition coöperating with that in the yoke, and a reciprocatory valve stem having disks controlling the flow of steam and water.

14. A steam trap comprising in combination, a movable bowl, a yoke coöperating therewith, a steam inlet and water inlet and outlet means in communication with said yoke, the latter having a partition separating the steam inlet and water outlet, a valve casing having a partition registering with that in the yoke, and means for securing the valve casing to the yoke with said partitions in substantial register.

15. A steam trap comprising in combination a movable bowl, a yoke coöperating therewith, a steam inlet and water inlet and outlet means in communication with said yoke, the latter having a partition separating the steam inlet and water outlet, a valve casing, a partition adapted to coöperate with that in the yoke, and means to secure said valve casing to said yoke with said partitions in substantial register, thereby to provide a steam inlet at one side of said partitions, and a water outlet at the other side thereof.

16. A steam trap comprising in combination, a movable bowl, a yoke coöperating therewith, a steam inlet and water inlet and outlet means in communication with said yoke, the latter having a partition separating the steam inlet and water outlet, a valve casing, a partition adapted to coöperate with that in the yoke, means to secure said valve casing to said yoke with said partitions in substantial register, thereby to provide a steam inlet at one side of said partitions, and a water outlet at the other side thereof, and valve means mounted in said casing and controlling the steam inlet and water inlet.

17. A steam trap comprising in combination, a movable bowl, a yoke coöperating therewith, a steam inlet and water inlet and outlet means in communication with said yoke, the latter having a partition separating the steam inlet and water outlet, a valve casing, a partition adapted to coöperate with that in the yoke, means to secure said valve casing to said yoke with said partitions in substantial register, thereby to provide a steam inlet at one side of said partitions and a water outlet at the other side thereof, and a valve stem mounted in said casing and having disks controlling the steam inlet and water outlet.

18. A steam trap comprising in combination, a movable bowl, a yoke coöperating therewith, a steam inlet and water inlet and outlet means in communication with said yoke, the latter having a partition separating the steam inlet and water outlet, a valve casing, a partition adapted to coöperate with that in the yoke, means to secure said valve casing to said yoke with said partitions in substantial register, thereby to provide a steam inlet at one side of said partitions, and a water outlet at the other side thereof, valve means mounted in said casing and controlling the steam inlet and water inlet, and an operating connection between the bowl and said valve means.

19. A steam trap comprising in combination, a movable bowl, a yoke coöperating therewith, a steam inlet and water inlet and outlet means in communication with said yoke, the latter having a partition separating the steam inlet and water outlet, a valve casing, a partition adapted to coöperate with that in the yoke, means to secure said valve casing to said yoke with said partitions in substantial register, thereby to provide a steam inlet at one side of said partitions and a water outlet at the other side thereof, a valve stem mounted in said casing and having disks controlling the steam inlet and water outlet, and an operating connection between the bowl and said valve stem.

20. A steam trap comprising in combination, a movable bowl, a yoke coöperating therewith and having a partition, a valve casing having a partition and secured to said yoke with said partitions in substantial register, said partition having a steam vent.

21. A steam trap comprising in combination, a movable bowl, a yoke coöperating therewith and having a partition, a valve casing having a partition, said valve casing being secured to the yoke with said partitions in register, and a valve stem passing through said casing partition and having valve disks above and below said casing partition.

22. A steam trap comprising in combination, a movable bowl, a yoke coöperating therewith and having a partition, a valve casing having a partition, said casing being secured to the yoke with said partitions in substantial register, said valve casing having a steam inlet and a water outlet port, and a valve stem passing through said casing partition and having valve disks coöperating with said ports.

23. A steam trap comprising in combination, a movable bowl, a yoke coöperating therewith and having a partition, a valve casing having a partition, said casing being secured to the yoke with said partitions in substantial register, said valve casing having a steam inlet and a water outlet port, and a valve stem passing through said casing partition and having valve disks coöperating with said ports, said valve stem also having means to control the steam vent.

24. A steam trap comprising in combination, a movable bowl, a yoke coöperating therewith and having a partition, a valve casing having a partition, said valve casing being secured to the yoke with said partitions in substantial register, a steam inlet port above said partitions and a water outlet port below said partitions, a valve stem passing through said partition in the valve casing and having disks coöperating with said ports.

25. A steam trap comprising in combination, a movable bowl, a yoke coöperating therewith and having a partition, a valve casing having a partition, said valve casing being secured to the yoke with said partitions in substantial register, a steam inlet port above said partitions and a water outlet port below said partitions, a valve stem passing through said partition in the valve casing and having disks coöperating with said ports, and an operating connection between the bowl and said valve stem.

26. A steam trap having in combination, a bowl support provided with a steam inlet and inlet and outlet means for the water of condensation, two pipes pivoted upon said support and in communication with said inlet and outlet, a bowl mounted upon and in communication with said pipes, and a duplex valve operated by pivotal movement of said bowl and controlling the admission of steam and the outlet for the water of condensation.

27. A steam trap comprising in combination, a bowl support having a steam inlet and an inlet and outlet for water of condensation, two pipes pivoted upon said support, one constituting a steam inlet and the other constituting a water inlet and water outlet, a bowl mounted upon and in communication with said pipes, and a duplex valve operated by tilting movement of said bowl, and controlling the flow of water and steam through said pipes.

28. A steam trap comprising in combination, a bowl support having a steam inlet and an inlet and outlet for water of condensation, two pipes pivoted upon said support, one constituting a steam inlet and the other constituting a water inlet and water outlet, a bowl mounted upon and in communication with said pipes, and a duplex valve operated by tilting movement of said bowl and controlling the inlet of steam and the outlet of water of condensation through said pipes.

29. A steam trap comprising in combination, a bowl support having a steam inlet and an outlet and inlet for water of condensation, two pipes pivoted upon said support, one constituting a steam inlet and the other constituting a combined water inlet and outlet, a bowl mounted upon and in communication with said pipes, and a reciprocatory valve stem operatively connected with and moved by tilting movement of the bowl, said valve stem having two valve disks controlling the flow of steam and water through said pipes.

30. A steam trap comprising in combination, a bowl, a yoke coöperating therewith provided with a partition 4, a valve casing 11 having a partition 19, means for securing said valve casing to said yoke with said partitions in substantial register, and valve means coöperating with said partition.

31. A steam trap comprising in combination, a bowl, a yoke coöperating therewith having a partition 4, a valve casing 11 having a partition 19, means for securing said casing and yoke together with said partitions in substantial register, said valve casing having a steam inlet 17 and a water outlet 18, and a valve stem 28 having disks 29, 30 controlling said steam inlet and water outlet.

32. A steam trap having a yoke coöperating therewith, said yoke having a partition separating the steam inlet and the water outlet, said yoke having an open face at said partition.

33. A steam trap comprising in combination, a bowl, a yoke coöperating therewith having steam inlet and water outlet means, said yoke having a partition separating the steam inlet and the water outlet, the wall of said yoke being open at opposite faces of said partition.

34. A steam trap comprising in combination, a bowl having a yoke 2 coöperating therewith, the latter having a partition 4 separating the steam inlet and water outlet, said yoke having openings 9, 10 at opposite faces of said partition.

35. A valve casing for steam traps and the like having inlet and outlet ports, a partition in said casing and extending to an open face thereof, thereby to provide ports at opposite faces of said partition, and means for securing said casing to a coöperating structure with said open face in operative relation thereto.

36. A valve casing for steam traps and the like having therein a steam inlet port and a water outlet port, a partition separating said ports and extending to an open face of said casing, and means for securing said valve casing to a coöperating part, so as to bring said open face into operative relation thereto.

37. A valve casing for steam traps and the like provided with an inlet passage 17 and an outlet passage 18, said valve casing having a partition 19 and passages 20 and 21 at opposite faces of said partition, and means for securing said valve casing to a coöperating part with said passages 20 and 21 in operative relation thereto.

38. A valve casing for steam traps and the like provided with an inlet passage 17 and an outlet passage 18, said valve casing having a partition 19 and passages 20 and 21 at opposite faces of said partition, and a valve stem mounted in said partition 19 and having disks controlling the flow through said inlet passage 17 and outlet passage 18.

39. A valve casing for steam traps and the like having a steam inlet 17 and a water outlet 18, a partition 19 in said casing extending to an open face thereof and providing passages 20 and 21, said partition having a steam vent therein.

40. A valve casing for steam traps and the like having a steam inlet 17 and a water outlet 18, a partition 19 in said casing extending to an open face thereof and providing passages 20, 21, a valve stem mounted in said casing and extending through said partition and having disks controlling said steam inlet and water outlet.

41. A valve casing for steam traps and the like having a steam inlet 17 and a water outlet 18, a partition 19 in said casing extending to an open face thereof and providing passages 20, 21, a valve stem mounted in said casing and extending through said partition and having disks controlling said steam inlet and water outlet, said partition having a steam vent and said valve having means controlling the said vent.

42. A steam trap comprising a movable bowl, pipes for the flow of steam and water of condensation, and a single valve means controlled by movement of the bowl and itself controlling the steam inlet, the water outlet and the venting of steam from said bowl.

43. A steam trap comprising in combination, a movable bowl, a steam inlet pipe, a combined water inlet and water outlet pipe, a single valve stem having thereon valve members controlling the flow of steam and water of condensation, and an operating connection between the bowl and said valve stem, whereby said valve stem and its members are operated by movement of the bowl.

44. A steam trap comprising in combination, a movable bowl, a steam inlet pipe, a combined water inlet and water outlet pipe, and a single valve means controlling both the steam inlet and the water outlet.

45. A steam trap comprising in combination, a movable bowl, a steam inlet pipe, a combined water inlet and water outlet pipe, a single valve means controlling the steam inlet and the water outlet, and an operating connection between the bowl and said valve means, whereby said valve means is operated by movement of the bowl.

46. A steam trap comprising in combination, a movable bowl, a steam inlet pipe, a pipe serving in alternation as a water inlet and a water outlet pipe, a casing, valve means therein having valve members controlling the flow of water of condensation and of steam through said pipes, and an operating connection between the bowl and said valve means, whereby the latter is operated by movement of the bowl.

47. A steam trap comprising in combination, a movable bowl, a steam inlet pipe, a pipe serving in alternation as a water inlet and a water outlet pipe, unitary valve means having valve members controlling the flow of water of condensation and of steam through said pipes, and an operating connection between the bowl and said valve means, whereby the latter is operated by movement of the bowl.

48. A steam trap comprising in combination, a movable bowl, a steam inlet pipe, a pipe serving in alternation as a water inlet and a water outlet pipe, a single valve means having valve members controlling the flow of water of condensation and of steam through said pipes, and an operating connection between the bowl and said valve means, whereby the latter is operated by movement of the bowl.

49. A steam trap comprising in combination, a movable bowl, a steam inlet pipe, a pipe serving in alternation as a water inlet and a water outlet pipe, a single valve stem having thereon valve members controlling the flow of water of condensation and of steam through said pipes, and an operating connection between the bowl and said valve means whereby the latter is operated by movement of the bowl.

50. A steam trap comprising in combination, a movable bowl, a steam inlet pipe, a combined water inlet and water outlet pipe, a support for said bowl and with which both of said pipes communicate, valve means having valve members located below the level of the bowl in its lowest position and permitting the simultaneous opening and the simultaneous closing of said pipes to the flow of water of condensation and steam, and an operating connection between the bowl and said valve means, whereby the latter is operated by movement of the bowl.

51. A steam trap comprising in combination, a movable bowl, counterweighting means therefor, a steam inlet pipe, a water inlet pipe, water outlet means, and a single valve means having members adapted to be simultaneously opened or simultaneously closed to control the flow of water of condensation and steam through said pipes.

52. A steam trap comprising in combination, a movable bowl, counterweighting means therefor, a steam inlet pipe, a water inlet pipe, water outlet means, a valve casing, and valve means therein having members adapted to be simultaneously opened and simultaneously closed to control the flow of water and steam.

53. A steam trap comprising in combination, a movable bowl, counterweighting means therefor, a steam inlet pipe, a water inlet pipe, water outlet means, a valve casing, valve means therein having members for controlling the flow of steam and the outflow of water, and an operating connection between the bowl and said valve means, whereby the latter is operated by movement of the bowl.

54. A steam trap comprising in combination, a movable bowl, counterweighting means therefor, a steam inlet pipe, a water inlet pipe, water outlet means, a single valve means to control the flow of steam and the outflow of water, and an operating connection between the bowl and said valve means, whereby the latter is operated by movement of the bowl.

55. A steam trap comprising in combination, a movable bowl, counterweighting means therefor, a steam inlet pipe, a water inlet pipe, water outlet means, a valve stem having members thereon controlling the flow of steam and the outflow of water, and an operating connection between the bowl and said valve means, whereby the latter is operated by movement of the bowl.

56. A steam trap comprising in combination, a movable bowl, a yoke coöperating therewith, a steam inlet, water inlet and water outlet means in communcation with said yoke, the points of water outlet and of steam inlet being in substantially vertical alinement and below the level of the support of said bowl, the yoke having a partition separating the steam inlet from the water outlet, and valve means governing the flow of steam at one side of said partition and of the water of condensation at the other side thereof.

57. A steam trap comprising in combination, a movable bowl, a yoke coöperating therewith, a steam inlet, a water inlet, and outlet means in communication with said yoke, the latter having a partition separating the steam inlet from the water outlet, and a single valve means governing the flow of steam at one side of said partition and of the water of condensation at the other side thereof.

58. The combination with a support of a receiver mounted thereon, a water discharge valve, a steam admission valve, a vent valve, a fitting containing all of said valves, and means for automatically operating said valves on movement of said receiver.

59. The combination with a support, of a receiver mounted thereon, a water discharge valve, a steam admission valve, a fitting containing both of said valves, and means for automatically operating said valves on movement of said receiver.

60. The combination with a support of a receiver mounted thereon, a water discharge valve, a vent valve, a fitting containing both of said valves, and means for automatically operating said valves on movement of said receiver.

61. The combination of a support having hollow arms, a receiver mounted on said support, a valve for controlling the discharge of the water of condensation from said receiver through one of said hollow arms, a valve for admitting steam to said receiver through the other hollow arm and a fitting connected to said support containing both of said valves.

62. The combination of a receiver with a support therefor having hollow arms, one for conducting fluid to and the other for conducting fluid from said receiver, a valve fitting connected to said support and valves therein for controlling the passage of the fluid through said arms.

63. The combination of means for receiving water of condensation of steam with a support therefor, water outlet and steam inlet valves connected to the bottom of the support, and means connecting said valves with said receiver for operating the former by the latter.

64. A steam trap comprising in combination, a movable bowl, a steam inlet pipe, a combined water inlet and water outlet pipe, a fitting, a valve stem having valve members in said fitting and controlling the flow of water of condensation and steam, and an operating connection between the bowl and said valve stem, whereby the latter is operated by movement of the bowl.

65. A steam trap comprising in combination, a bowl, a support therefor, a steam inlet pipe and a combined water inlet and water outlet pipe leading to said bowl, a fitting at the lower part of said support, valve means having valve members in said fitting and controlling the flow of water of condensation and steam, and an operating connection between the bowl and said valve means, whereby the latter is operated by movement of the bowl.

66. A steam trap comprising in combination, a movable bowl, a steam inlet pipe, water inlet and water outlet pipe means, a reciprocatory valve having two disks respectively controlling the steam inlet and the water outlet, and an operating connection between the bowl and said valve, whereby the latter is operated by movement of the bowl.

67. A steam trap comprising in combination, a movable bowl, a yoke therefor having two upwardly extending arms, a steam inlet pipe, a combined water inlet and water outlet pipe, a fitting at and communicating with the lower part of said yoke, valve means having valve members in said fitting and controlling the flow of water of condensation and steam, and an operating connection between the bowl and said valve means whereby the latter is operated by movement of the bowl.

68. A steam trap comprising in combination, a movable bowl, a supporting yoke therefor having two upwardly extending arms, a steam inlet pipe and a combined water inlet and water outlet pipe communicating with said bowl, a fitting at and communicating with the lower part of said yoke, a reciprocatory valve means having members in said fitting and controlling the flow of steam and water of condensation, and an operating connection between the bowl and said valve means whereby the latter is operated by movement of the bowl.

69. A steam trap comprising in combination, a movable bowl, a supporting yoke therefor having two upwardly extending members, a steam inlet pipe, a combined water inlet and water outlet pipe both communicating with said bowl, a reciprocatory valve located at the lower portion of said yoke and having two disks respectively controlling the steam inlet and the water outlet, and an operating connection between the bowl and said valve, whereby the latter is operated by movement of the bowl.

70. A steam trap comprising in combination, a movable bowl, a yoke having two upwardly extending arms, counterweighting means for said bowl, a steam inlet pipe, a combined water inlet and water outlet pipe communicating with said bowl, a fitting located at the lower part of said yoke and having valve means controlling the flow of steam and water and the venting of steam from said trap, and an operating connection between the bowl and said valve whereby the latter is operated by movement of the bowl.

71. A steam trap comprising in combination, a movable bowl, a yoke having two upwardly extending arms, counterweighting means for said bowl, a steam inlet pipe, a water inlet pipe, water outlet means, a fitting at the lower portion of said bowl having valve members therein directly controlling the flow of steam and outflow of water and permitting the simultaneous inflow of steam and outflow of water of condensation, and an operating connection between the bowl and said valve means whereby the latter is operated by movement of the bowl.

72. A steam trap comprising in combination, a movable bowl having a steam inlet and water inlet and outlet pipe means, and a valve stem having thereon two disks respectively controlling the flow of steam and water to and from said bowl.

73. A steam trap comprising in combination, a movable bowl having a steam inlet and water inlet and outlet pipe means, and a valve stem having thereon two valve members respectively controlling the flow of steam and the flow of water from said bowl.

74. A steam trap comprising in combination, a bowl, a support therefor, steam inlet and water inlet and outlet means coöperating with said bowl, said support having a partition separating the steam inlet and water outlet, a valve casing at said partition, and valve means in said casing coöperating with said bowl.

75. A steam trap comprising in combination, a bowl, a support therefor having passages and a partition, and a valve fitting provided with a partition mating with the partition of said support.

76. The combination with a support, of a movable receiver mounted thereon, a water discharge valve, a steam admission valve, a fitting distinct from said receiver and containing both of said valves and means to operate said valves.

77. The combination with a support of a movable receiver mounted thereon, a water discharge valve, a steam admission valve, a vent valve, a fitting containing all of said valves, and means for operating said valves.

78. The combination with a support of a movable receiver mounted thereon, a water discharge valve, a vent valve, a fitting containing both of said valves, and means for operating said valves.

79. The combination of means for receiving water of condensation of steam with a supporting yoke therefor having two hollow arms, water outlet and steam inlet valves connected to the bottom of the said yoke, and means connecting said valves with said receiver for operating the former by the latter.

80. The combination of a receiver, a supporting yoke therefor having a partition separating passages therein, and a valve casing having a partition to mate with said yoke partition.

81. The combination with a receiver of a supporting yoke therefor having a partition separating passages therein, a valve casing having passages, and a partition to mate with said yoke partition, and valves in said casing controlling said passages.

82. A steam trap comprising in combination, a movable bowl, counterweighting means therefor, a steam inlet pipe, a water inlet pipe, water outlet means, a valve casing, and valve means therein having members adapted to be simultaneously opened and simultaneously closed to control the outflow of water and the flow of steam.

In testimony whereof, I have signed my name to this specification, in the presence of two subscribing witnesses.

FRANK A. LITTLEFIELD.

Witnesses:
L. B. ARCHER,
CHAS. J. LEONARD.

Copies of this patent may be obtained for five cents each, by addressing the "Commissioner of Patents, Washington, D. C."